US007722232B2

(12) United States Patent
Nakada et al.

(10) Patent No.: US 7,722,232 B2
(45) **Date of Patent: *May 25, 2010**

(54) LAMP UNIT OF VEHICLE HEADLAMP

(75) Inventors: Yusuke Nakada, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 12/054,956

(22) Filed: Mar. 25, 2008

(65) Prior Publication Data

US 2008/0239741 A1 Oct. 2, 2008

(30) Foreign Application Priority Data

Mar. 26, 2007 (JP) ............................ 2007-079028

(51) Int. Cl.
*B60Q 1/00* (2006.01)

(52) U.S. Cl. ........................ 362/507; 362/516; 362/538

(58) Field of Classification Search ................. 362/507, 362/538, 539, 545, 516, 517, 518, 520, 521, 362/522

See application file for complete search history.

(56) References Cited

U.S. PATENT DOCUMENTS 4,686,610 A * 8/1987 Cibie et al. ................. 362/517
7,284,888 B2 * 10/2007 Pauty et al. ................. 362/539
7,341,366 B2 * 3/2008 Iwasaki ...................... 362/538
2005/0276062 A1 12/2005 Pauty et al.
2006/0098450 A1 5/2006 Iwasaki

FOREIGN PATENT DOCUMENTS

CN 1707154 A 12/2005
JP 2005-166590 6/2005

OTHER PUBLICATIONS

Patent Abstracts of Japan, Publication No. 2005-166590 dated Jun. 23, 2005, 2 pages.
Office Action in Chinese Patent Application No. 200810088418.7 dated Nov. 13, 2009 with English translation (9 pages).

* cited by examiner

*Primary Examiner*—Gunyoung T Lee
(74) *Attorney, Agent, or Firm*—Osha • Liang LLP

(57) ABSTRACT

A lamp unit of a vehicle lamp includes a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis. A mirror member is provided between the reflector and the projection lens. The mirror member includes an upward reflecting surface that upward reflects a portion of the reflected light from the reflector, and a front end edge formed so as to pass through the rear focal point of the projection lens. A region of the upward reflecting surface located nearer a self-lane side than the optical axis is constituted with a horizontal plane including the optical axis. A shielding projection that shields the reflected light from the reflector deflected by the horizontal plane is formed in a position of the horizontal plane that is apart from the front end edge of the upward reflecting surface to a rear side.

10 Claims, 6 Drawing Sheets

LAMP UNIT OF VEHICLE HEADLAMP

This application claims foreign priority from Japanese Patent Application No. 2007-079028 filed on Mar. 26, 2007, the entire contents of which are hereby incorporated by reference.

BACKGROUND OF THE INVENTION

1. Field of the Invention

The present invention relates to a lamp unit of a vehicle headlamp, and particularly, relates to a projector-type lamp unit that uses a light-emitting element as a light source.

2. Related Art

In recent years, even in vehicle headlamps, lamp units that use a light-emitting element, such as a light-emitting diode, as a light source have been adopted.

For example, Patent Document 1 discloses a so-called projector-type lamp unit including a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis.

In such a case, in the lamp unit disclosed in Patent Document 1, a mirror member that has an upward reflecting surface that upward reflects a portion of the reflected light from the reflector, and has a front end edge formed so as to pass through the rear focal point of the projection lens is provided between the reflector and the projection lens. A portion of the reflected light from the reflector is reflected upward by the mirror member, thereby forming a light distribution pattern for low beams that has a cut-off line as an inverted projection image of a front end edge of the upward reflecting surface at its upper end.

[Patent Document 1] JP-A-2005-166590

In the projector-type lamp unit provided with a mirror member as disclosed in the above Patent Document 1, a light distribution pattern for low beams that has clear cut-off lines at its upper end can be formed while the utilization efficiency of the light from the light-emitting element can be enhanced.

However, this lamp unit is configured such that a portion of the reflected light from a rear reflector is reflected upward by the mirror member. Thus, not only a region in the vicinity below the self-lane cut-off line in the light distribution pattern for low beams becomes bright, but also, a region in the vicinity below the opposite-lane cut-off line becomes bright. The light that forms the region in the vicinity below the opposite-lane cut-off line may be regularly reflected by a road surface that gets wet, for instance, during a rainy day and enter driver's eyes on the opposite lane. The light may enter driver's eyes on the opposite lane even a vehicle is pitched. Thus, there is a problem in that, if the light is excessively strong, large glare may be given to a driver in the opposite lane.

SUMMARY OF THE INVENTION

One or more embodiments of the invention provide a lamp unit capable of preventing large glare from being given to a driver in the opposite lane as well as capable of forming a light distribution pattern for low beams that has clear cut-off lines at its upper end, when a projector-type lamp unit that uses a light-emitting element as a light source is adopted as the lamp unit of a vehicle headlamp.

One or more embodiments of the invention include a configuration in which a mirror member that upward reflects a portion of the reflected light from a reflector is provided.

The lamp unit of a vehicle lamp according to one or more embodiments of the invention includes a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis. A mirror member that has an upward reflecting surface that upward reflects a portion of the reflected light from the reflector and has a front end edge formed so as to pass through the rear focal point of the projection lens is provided between the reflector and the projection lens. A region of the upward reflecting surface located nearer the self-lane side than the optical axis is constituted with a horizontal plane including the optical axis. A shielding projection that shields the reflected light from the reflector deflected by the horizontal plane is formed in the position of the horizontal plane that is apart from the front end edge of the upward reflecting surface to the rear side.

The above "light-emitting element" means a light source in the shape of an element that has a light-emitting chip that surface-emits light substantially in the shape of a point. The type of the light-emitting element is not particularly limited. For example, a light emitting diode, a laser diode, etc. can be adopted. Further, although the "light-emitting element" is arranged so as to face upward in the vicinity of the optical axis, the light-emitting element is not necessarily arranged so as to face vertically upward.

As for the above "upward reflecting surface," the configuration of a region on the side of the opposite lane in the upward reflecting surface is not particularly limited so long as a region on the side of the self-lane is constituted with a horizontal plane including an optical axis. For example, it is possible to adopt a configuration in which the upward reflecting surface is constituted with a middle slope that extends obliquely downward from the optical axis and a horizontal plane that extends parallel to the above horizontal plane from a lower end edge of the middle slope, the upward reflecting surface is constituted with only an inclined surface that extends obliquely downward from the optical axis, the horizontal plane on the side of the self-lane is formed so as to extend to the opposite lane, or the like.

The above "shielding projection" is not particularly limited in terms of its specific configuration, such as the shape or size thereof, or the number of projections to be formed, so long as it is configured to be able to shield a portion of the reflected light of a reflector reflected by the first horizontal plane. Further, even as for the formation position of the "shielding projection," the specific position of the shielding projection is not particularly limited if it is a "position apart from the front end edge of the upward reflecting surface to the rear side."

The lamp unit of a vehicle headlamp according to one or more embodiments of the invention is constituted as a projector-type lamp unit that uses the light-emitting element as a light source. However, the mirror member that has the upward reflecting surface that upward reflects a portion of the reflected light from the reflector and that is formed so that the front end edge of the upward reflecting surface may pass through the rear focal point of the projection lens is provided between the reflector and the projection lens. Thus, it is possible to form the light distribution pattern for low beams that has clear cut-off lines at its upper end while the utilization efficiency of the light from the light-emitting element can be enhanced.

Because a region of the upward reflecting surface on the side of the self-lane is constituted with a first horizontal plane including the optical axis, but a shielding projection that shields a portion of the reflected light from the reflector reflected by the horizontal plane is formed in the position of the horizontal plane that is apart from the front end edge of the upward reflecting surface to the rear side, the following operation effects can be obtained.

The light shielded by the shielding projection is the light that forms a region in the vicinity below the opposite-lane cut-off line in the light distribution pattern for low beams. Thus, by preventing this light from being radiated forward, the region in the vicinity below the opposite-lane cut-off line can be prevented from becoming brighter than necessary. Accordingly, even if the light that forms the region in the vicinity below the opposite-lane cut-off line enters driver's eyes on the opposite lane when the light is regularly reflected by a road surface that gets wet, for instance, during a rainy day or a vehicle is pitched, large glare can be prevented from being given to a driver in the opposite lane.

As described above, according to one or more embodiments of the invention, when a projector-type lamp unit that uses a light-emitting element as a light source is adopted as the lamp unit of a vehicle headlamp, large glare can be prevented from being given to a driver in the opposite lane while the light distribution pattern for low beams that has clear cut-off lines at its upper end can be formed.

If the end of the upper end face of the upright wall opposite the optical axis is constituted with the inclined surface whose height becomes gradually small in a direction away from the optical axis, the amount of the light shielded by the upright wall can be gradually changed at the end of the upper end face of the upright wall opposite the optical axis. This makes it possible to effectively suppress occurrence of light distribution unevenness at a horizontal outside end in a region in the vicinity below the opposite-lane cut-off line. Particularly, because the horizontal outside end in the region in the vicinity below the opposite-lane cut-off line is low in luminous intensity and is easily conspicuous in light distribution unevenness, as compared with a central portion of the light distribution pattern for low beams, it is especially effective to adopt such a configuration.

The formation position of the "shielding projection" is not particularly limited as described above. In one or more embodiments, if the position of the front end edge of the shielding projection is set to the position of 1 to 4 mm from the rear focal point of the projection lens, the portion of the upward reflecting surface located ahead of the shielding projection will ensure the function as the upward reflecting surface. Thus, a portion of the light directed to a region in the vicinity below the opposite-lane cut-off line can be formed efficiently while the cut-off line formed by the front end edge of the upward reflecting surface can be formed clearly.

Other aspects and advantages of the invention will be apparent from the following description, the drawings and the claims.

DETAILED DESCRIPTION OF THE EXEMPLARY EMBODIMENTS

Hereinafter, embodiments of the invention will be described with reference to the accompanying drawings.

Figure 1:
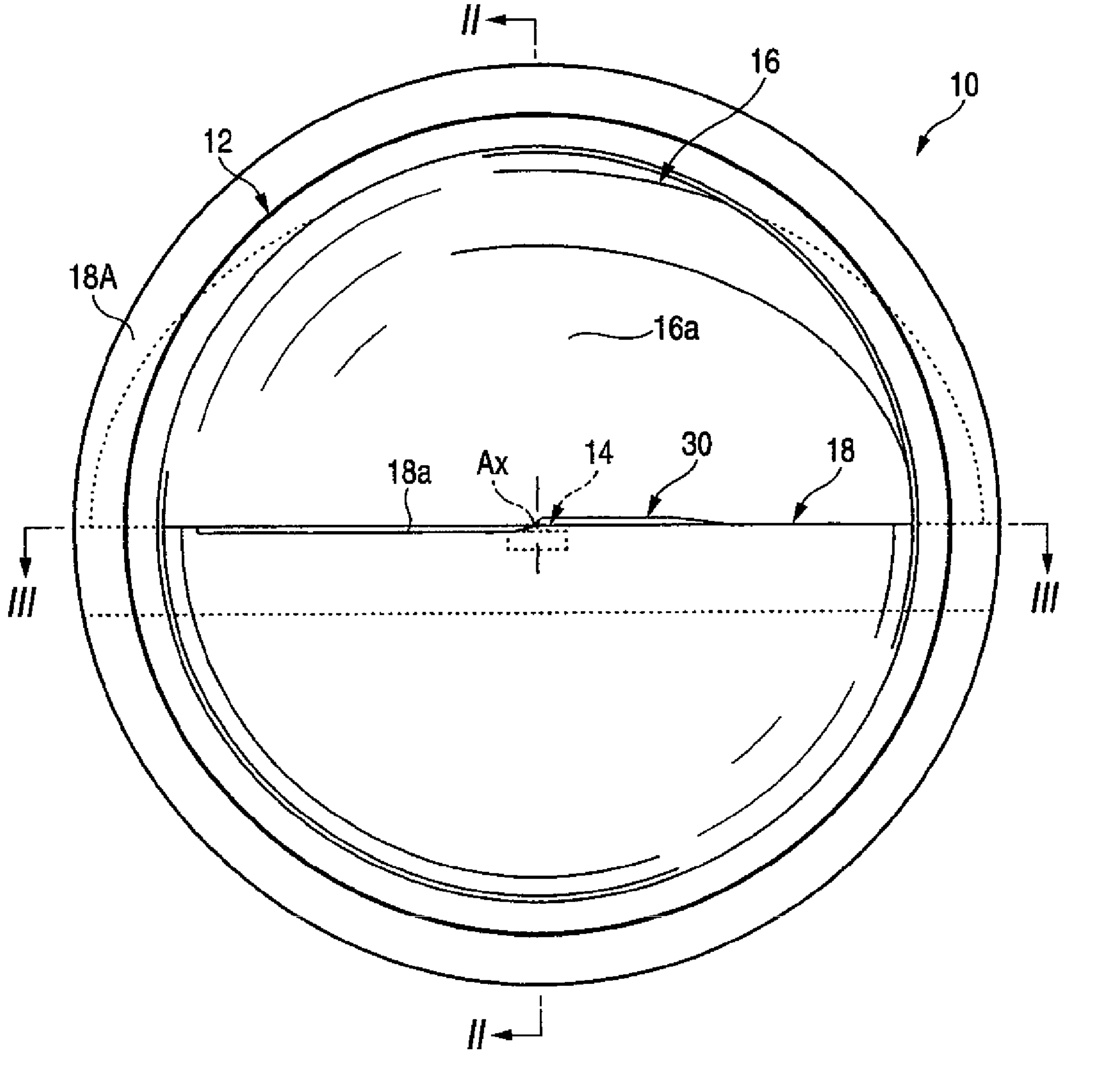
FIG. 1 is a front view showing a lamp unit of a vehicle headlamp according to one embodiment of the invention.
Figure 2:
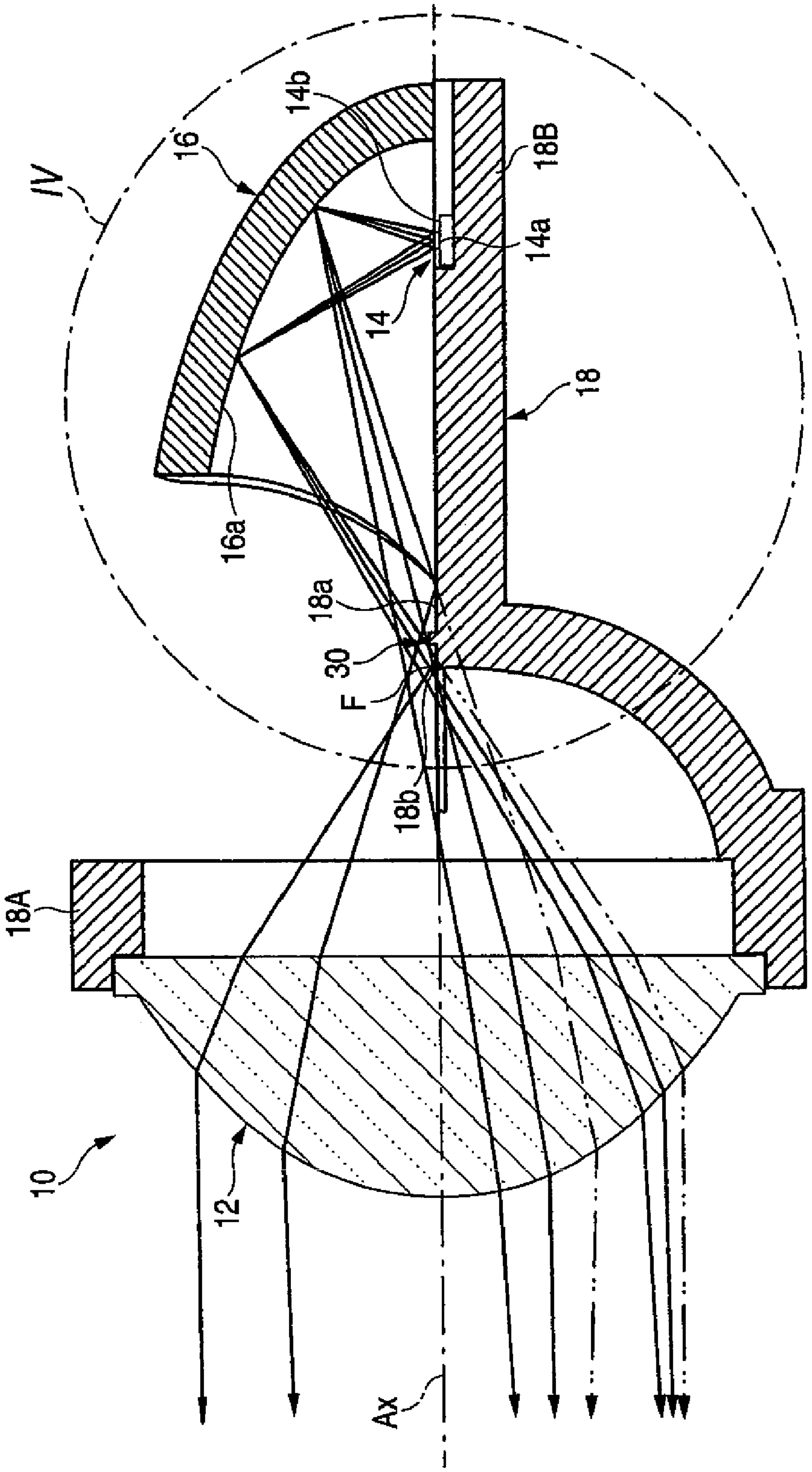
FIG. 2 is a sectional view taken along the line II-II of FIG. 1.
Figure 3:
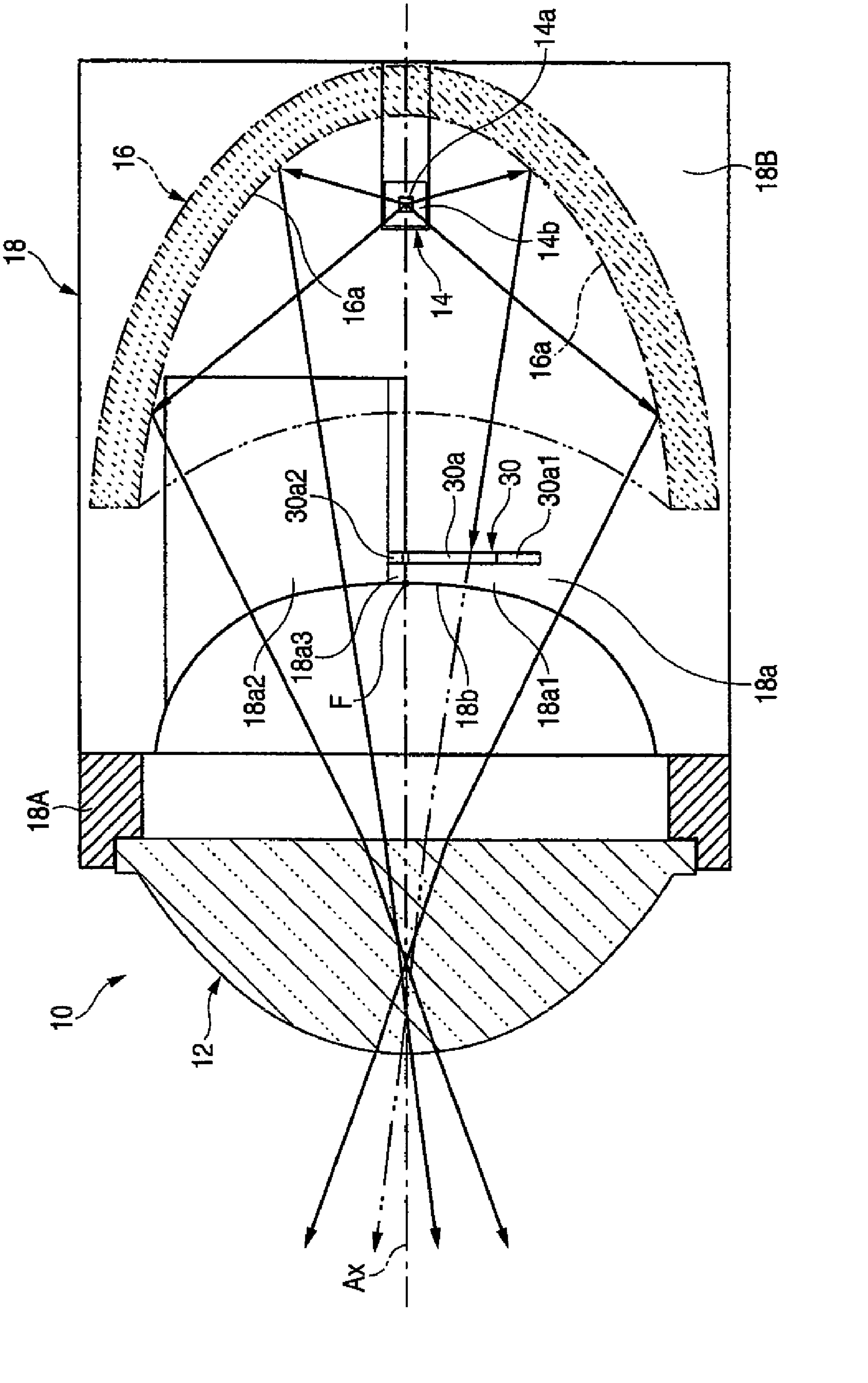
FIG. 3 is a sectional view taken along the line III-III of FIG. 1.

FIG. 1 is a front view showing a lamp unit 10 according to one embodiment of the invention. Further, FIG. 2 is a sectional view taken along the line II-II of FIG. 1, and FIG. 3 is a sectional view taken along the line III-III of FIG. 1.

As shown in these drawings, lamp unit 10 includes a projection lens 12 arranged on an optical axis Ax extending in the longitudinal direction of a vehicle, a light-emitting element 14 arranged behind a rear focal point F of the projection lens 12, a reflector 16 arranged so as to cover the light-emitting element 14 from above and deflects the light from the light-emitting element 14 forward toward the optical axis Ax, and a mirror member 18 arranged between the reflector 16 and the projection lens 12, which reflects a portion of the reflected light from the reflector 16 upward.

The lamp unit 10 is adapted to be used in a state where it is incorporated as a portion of a vehicle headlamp. In the state where the lamp unit is incorporated into the vehicle headlamp, the lamp unit is arranged in a state where the optical axis Ax thereof extends in a downward direction of about 0.5 to 0.6° with respect to the longitudinal direction of a vehicle. Also, the lamp unit 10 performs optical irradiation for forming a light distribution pattern for low beams of left light distribution.

The projection lens 12 includes a planoconvex aspheric lens whose front surface is a convex surface and whose rear surface is a plane surface, and is adapted to project a light source image formed on a rear focal plane (that is, a focal plane including rear focal point F) onto a virtual vertical screen ahead of the lamp as an inverted image. The projection lens 12 is fixed to a ring-shaped lens holder 18A formed integrally with the mirror member 18 such that it is located ahead of the mirror member 18.

The light-emitting element 14 is a white light diode, and is composed of a light-emitting chip 14*a* having a square light-emitting surface of about 1 mm×1 mm, and a substrate 14*b* that supports the light-emitting chip 14*a*. The light-emitting chip 14*a* is sealed by a thin film formed so as to cover the light-emitting surface. Also, the light-emitting element 14 is positioned and fixed in a recessed portion formed in an upper surface of a rear extension portion 18B that is formed to extend rearward from the mirror member 18 in a state where the light-emitting chip 14*a* is arranged so as to face vertically upward on the optical axis Ax.

A reflecting surface 16*a* of the reflector 16 is constituted with a curved surface substantially in the shape of an ellipsoid that has a major axis that is coaxial with the optical axis Ax, and uses the emission center of the light-emitting element 14 as a first focal point, and the eccentricity of the reflecting surface is set so as to increase gradually toward a horizontal cross section from a vertical cross section. Also, the reflecting surface 16*a* is configured so as to make the light from the light-emitting element 14 converge into a point located slightly ahead of the rear focal point F of the projection lens 12 in the vertical cross section, and to displace the converging position quite forward from the rear focal point F in the horizontal cross section. The reflector 16 is fixed to the upper surface of the rear extension portion 18B of the mirror member 18 at a peripheral lower end of the reflecting surface 16*a* thereof.

The mirror member 18 is constituted as a member in the shape of a substantially flat plate that extends in the horizontal direction, and the upper surface of the mirror member is constituted as an upward reflecting surface 18*a* extending rearward along the optical axis Ax from the rear focal point F. Also, the mirror member 18 reflects a portion of the reflected light from the reflector 16 upward in the upward reflecting surface 18*a* thereof. Further, the upward reflecting surface 18*a* is formed by performing specular processing by aluminum evaporation, etc. on the upper surface of the mirror member 18.

A front end edge 18*b* of the upward reflecting surface 18*a* is formed so as to extend along the rear focal plane of the projection lens 12. That is, the front end edge 18*b* is formed in a curved manner so as to be displaced gradually forward toward both sides of the optical axis Ax from the rear focal point F in plan view.

As for the upward reflecting surface 18*a*, a left region that is located on the left side (on the right side in the front view of the lamp) nearer the self-lane side than the optical axis Ax is constituted with a first horizontal plane 18*a*1 including the optical axis Ax, and a right region that is located on the right side nearer the opposite lane side than the optical axis A is constituted with a second horizontal plane 18*a*2 that is one-step lower than the left region via a middle slope 18*a*3 that extends obliquely downward from the optical axis. The right end and the rear extension portion 18B that are sufficiently apart from the rear focal point F in the right region are formed so as to be flush with the first horizontal plane 18*a*1 that constitutes the left region. The downward inclination angle of the middle slope 18*a*3 is set to 15°, and the second horizontal plane 18*a*2 is formed so as to be located about 0.4 mm below the first horizontal plane 18*a*1.

As shown in FIGS. 2 and 3, the light from the light-emitting element 14 reflected by the reflecting surface 16*a* of the reflector 16 is reflected forward toward the optical axis Ax and enters a lower region of the projection lens 12. A portion of the light enters the upward reflecting surface 18*a* of the mirror member 18, is reflected by the upward reflecting surface 18*a*, and then enters an upper region of the projection lens 12. Then, the light that has entered the lower region or upper region of the projection lens 12 is emitted forward as downward light from the projection lens 12.

Further, an upright wall 30 that extends in the vehicle width direction is formed in a position that is apart rearward from the front end edge 18*b* of the upward reflecting surface 18*a* in the first horizontal-plane 18*a*1 in the upward reflecting surface 18*a*. The upright wall 30 is constituted as a shielding projection that shields a portion of the reflected light from the reflector 16 reflected by the first horizontal plane 18*a*1.

Figure 4:
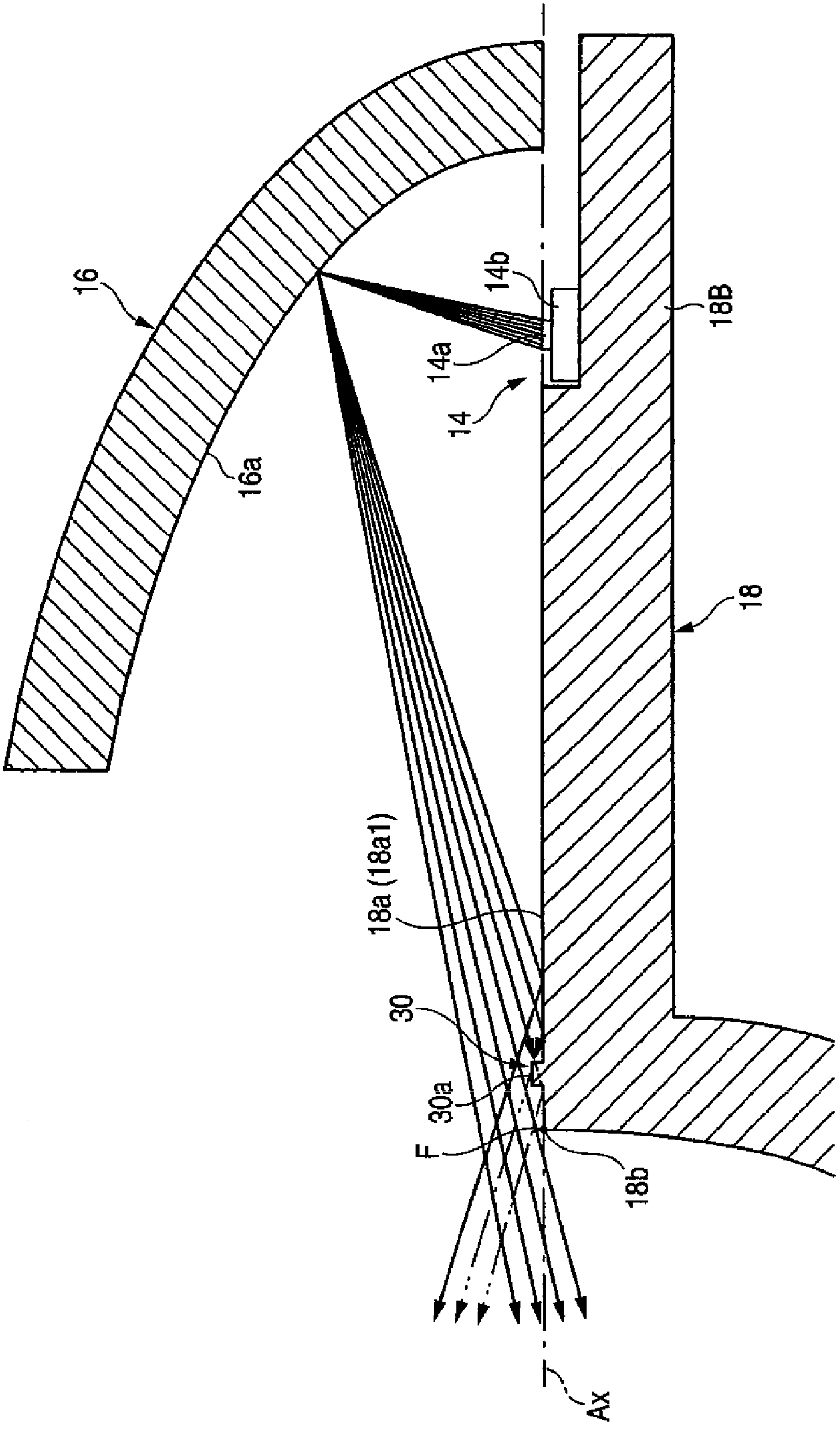
FIG. 4 is a detailed view of the portion IV of FIG. 2.

FIG. 4 is a detailed sectional view taken along the line IV-IV of FIG. 2. Further, FIG. 5 is a perspective view when the diffusing and reflecting portion 30 is seen from the oblique front left upper direction.

As shown in these drawings, the upright wall 30 is 0.3 to 0.7 mm (for example, 0.5 mm) in height, and 0.5 to 1.5 mm in front-and-rear width (for example, 1 mm), and is formed over a range of 8 to 15 mm (for example, 10 mm) to the left side of the optical axis Ax from near the optical axis Ax. The position of the front end edge of the upright wall 30 is set to a position of 1 to 4 mm (for example, 2 mm) from the rear focal point F.

Figure 5:
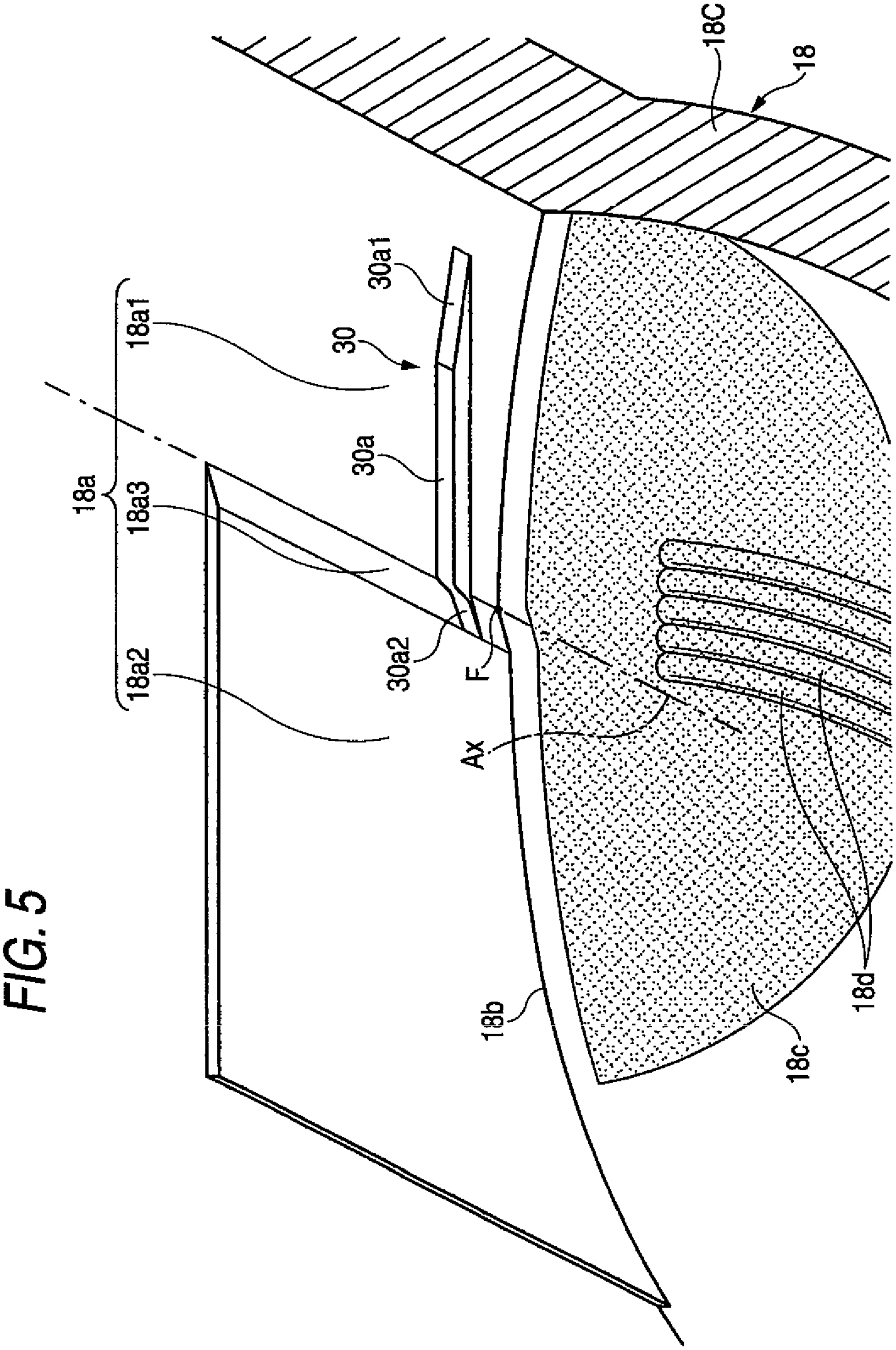
FIG. 5 is a perspective view when an upright wall of the lamp unit is seen from the oblique upper front left direction.

As shown in FIG. 5, although an upper end face 30*a* of the upright wall 30 is formed as a horizontal plane, a left end of the upright wall is constituted with an inclined surface 30*a*1 whose height becomes gradually small to the left in a range of 2 to 6 mm (for example, 4 mm).

Further, an inclined surface 30*a*2 that extends to the position of a lower end edge of the middle slope 18*a*3 is formed at a right end at the upper end face 30*a* of the upright wall 30 so as to extend at a larger inclination angle than the downward inclination angle of the middle slope 18*a*3 of the upward reflecting surface 18*a*. However, an upper end of the inclined surface 30*a*2 is constituted with a convex surface that protrudes upward so as to be adjacent to the left side of the optical axis Ax.

By forming the upright wall 30, as shown in FIG. 4, the reflected light from the reflector 16 that has entered a rear end face of the upright wall 30 is shielded. Also, in the reflected light from the reflector 16 that has entered the first horizontal plane 18*a*1 of the upward reflecting surface 18*a*, the light that has entered the first horizontal plane 18*a*1 in the vicinity of the rear of the upright wall 30 and that is reflected upward is shielded by the rear end face of the upright wall 30. The reflected light from the reflector 16 that has entered the upper end face 30*a* of the upright wall 30 will be reflected upward by the upper end face 30*a*, and will enter the projection lens 12.

As indicated by two-dot chain lines in this drawing, supposing that the upright wall 30 is not formed, the light shielded by the upright wall 30 is the light passing through the rear focal plane of the projection lens 12 near above the front end edge 18*b* of the upward reflecting surface 18*a*. Thus, the light radiated to a position nearer the line V-V line in the vicinity of below the opposite-lane cut-off line CL1 will be reduced due to the existence of the upright wall 30.

In addition, as shown in FIG. 5, a portion of the surface of a recessed bent portion 18C located below the front end edge 18*b* of the upward reflecting surface 18*a* of the mirror member 18 is constituted as a roughened portion 18*c* that is subjected to roughening by sandblasting, embossing, etc. The roughened portion 18*c* is formed in a region substantially in the shape of a bow with a portion of the front end edge 18*b* of the upward reflecting surface 18*a* as an upper chord. By forming the roughened portion 18*c* in the surface of the recessed bent portion 18C in this way, generation of glare light is effectively suppressed.

The surface of the recessed bent portion 18C along with the upward reflecting surface 18*a* is subjected to polishing, such as aluminum vapor deposition. Thus, of the reflected light from the reflector 16 that has reached the projection lens 12, the light that does not enter the projection lens 12, but is reflected by the rear surface of the projection lens, and has entered the surface of the recessed bent portion 18C is again reflected by the surface and is radiated forward as stray light from the projection lens 12, which may become glare light. Thus, by forming the roughened portion 18*c* in the surface of the recessed bent portion 18C, much of the light that has entered the recessed bent portion 18C is made to be irregularly reflected by the roughened portion 18*c*, thereby preventing the light that may become the cause of glare from being radiated forward from the projection lens 12.

In the region of the roughened portion 18*c* located in just below the optical axis Ax, a plurality of diffusing and reflecting elements 18*d* that extend in the up-and-down directions in the shape of a convex circular-arc horizontal section are formed. Accordingly, after the light that is reflected by the rear surface of the projection lens 12, and has entered the roughened portion 18*c* is irregularly reflected, a portion of the light is diffused and reflected in the horizontal direction by the plurality of diffusing and reflecting elements 18*d*. As a result, generation of glare light is more effectively suppressed.

Figure 6:
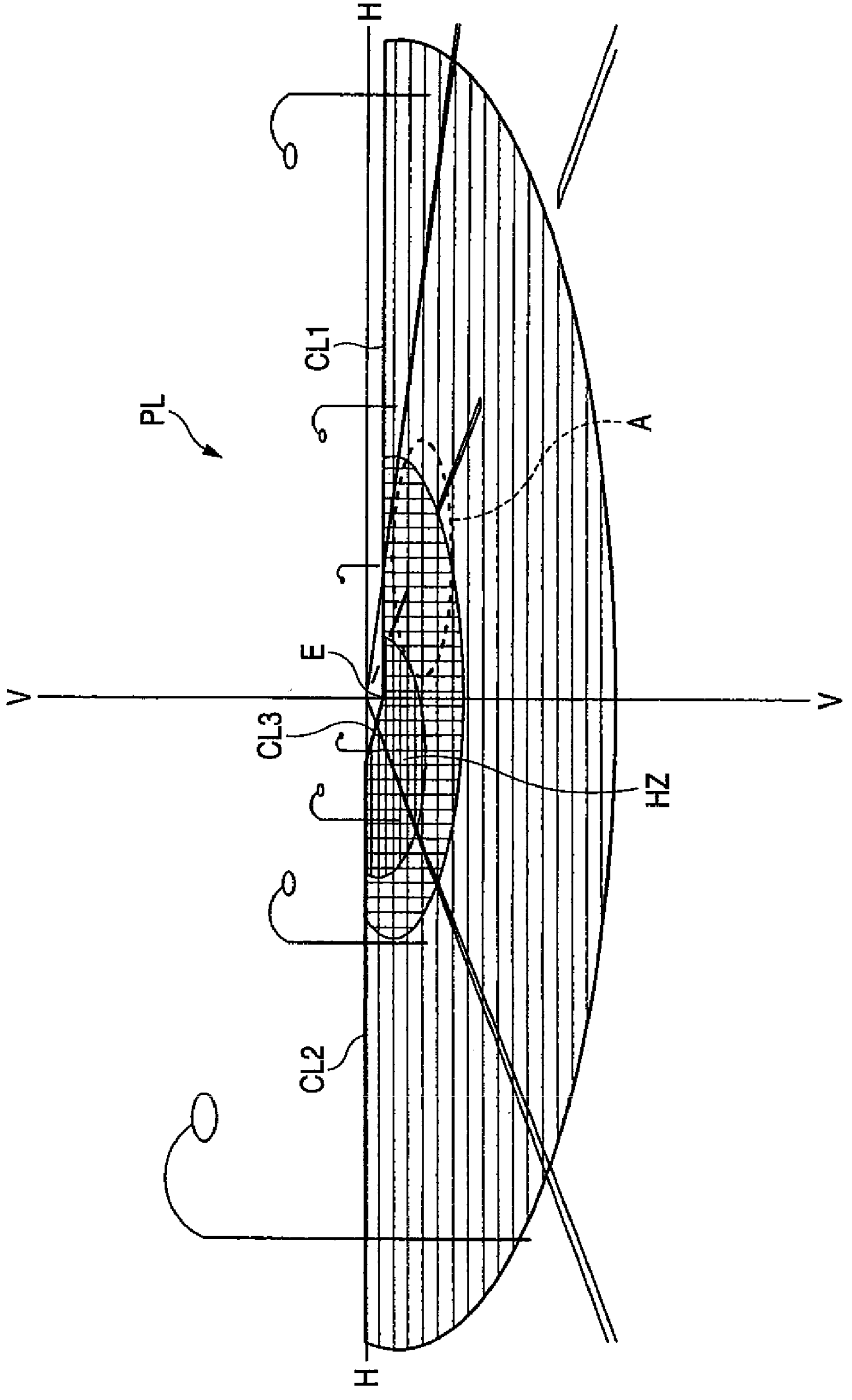
FIG. 6 is a perspective view showing a light distribution pattern for low beams formed on a virtual vertical screen, which is arranged in the position of 25 m ahead of a vehicle, by the light radiated forward from the lamp unit.

FIG. 6 is a perspective view showing a light distribution pattern PL for low beams formed on a virtual vertical screen, which is arranged in the position of 25 m ahead of a vehicle, by the light radiated forward from the lamp unit 10 according to one or more embodiments.

As shown in this drawing, the light distribution pattern PL for low beams is a light distribution pattern for low beams of left light distribution, and has cut-off lines CL1, CL2, and CL3 with a right-and-left height difference at its upper end edge.

The cut-off lines CL1, C-L2, and CL3 extend in the horizontal direction with a right-and-left height difference, with the line V-V that is a vertical line that passes through H-V that is a vanishing point ahead of the lamp as a borderline. On the right side of the line V-V, the cut-off line CL1 on the side of the opposite lane is formed so as to extend in the horizontal direction, and on the left side of the line V-V, the cut-off line CL2 on the side of the self-lane is formed so as to extend in the horizontal direction such that it is one-step higher than the cut-off line CL1 on the side of the opposite lane. Also, the end of the self-lane cut cut-off line CL2 nearer the line V-V is formed as an oblique cut-off line CL3. The oblique cut-off line CL3 extends at an inclination angle of 15° obliquely in the upper left direction from the point of intersection between the opposite-lane cut-off line CL1 and the line V-V.

In this light distribution pattern P for low beams, an elbow point E that is a point of intersection between the low-stage cut-off line CL1 and the line V-V is located about 0.5 to 0.6° below H-V. This is because the optical axis Ax extends in a downward inclined direction of about 0.5 to 0.6° with respect to the longitudinal direction of a vehicle. In this light distribution pattern PL for low beams, a hot zone HZ that is a high luminous-intensity region is formed so as to surround the elbow point E nearer the left.

The light distribution pattern PL for low beams is formed by projecting an image of the light-emitting element 14, which is formed on the rear focal plane of the projection lens 12 by the light from the light-emitting element 14 reflected by the reflector 16, as an inverted projection image onto the above virtual vertical screen by means of the projection lens 12, and the cut-off lines CL1, CL2, and CL3 are formed as an inverted projection image of the front end edge 18*b* of the upward reflecting surface 18*a* of the mirror member 18.

The light distribution pattern PL for low beams is a combined light pattern of a light distribution pattern formed by the light that has directly entered a lower region of the projection lens 12 in the light from the light-emitting element 14 reflected by the reflecting surface 16*a* of the reflector 16, and a light distribution pattern formed by the light that has entered an upper region of the projection lens 12 after being reflected by the upward reflecting surface 18*a* of the mirror member 18.

In this light distribution pattern PL for low beams, the reason why the hot zone HZ is formed so as to surround the elbow point E to the left is because the light radiated toward the position (the region A indicated by a broken line in this drawing) nearer the line V-V in the vicinity of below the opposite-lane cut-off line CL1 is reduced due to the existence of the upright wall 30 formed in the mirror member 18.

Thus, the light radiated toward the region A in the vicinity of below the opposite-lane cut-off line CL1 is reduced by the existence of the upright wall 30. Accordingly, even if the light that forms the region A enters driver's eyes on the opposite lane when the light is regularly reflected by a road surface that gets wet, for instance, during a rainy day or when a vehicle is pitched, the glare to a driver in the opposite lane will be reduced.

As described in detail above, the lamp unit 10 of a vehicle headlamp according to one or more embodiments is constituted as a projector-type lamp unit 10 that uses the light-emitting element 14 as a light source. However, the mirror member 18 that has the upward reflecting surface 18*a* that upward reflects a portion of the reflected light from the reflector 16 and that is formed so that the front end edge 18*b* of the upward reflecting surface 18*a* may pass through the rear focal point F of the projection lens 12 is provided between the reflector 16 and the projection lens 12. Thus, it is possible to form the light distribution pattern P1 for low beams that has clear cut-off lines CL1, CL2, and CL3 at its upper end, while it is possible to enhance the utilization efficiency of the light from the light-emitting element 14.

The self-lane region in the upward reflecting surface 18*a* is constituted with the first horizontal planes 18*a*1 including the optical axis Ax, and the opposite-lane region in the upward reflecting surface 18*a* is constituted with the middle slope 18*a*3 extending obliquely downward from the optical axis Ax, and the second horizontal plane 18*a*2 extending parallel to the first horizontal plane 18*a*1 from the lower end edge of the middle slope. However, because the upright wall 30 extending in the vehicle width direction is formed as a shielding projection that shields a portion of the reflected light from the reflector 16 reflected by the first horizontal plane 18*a*1, in a position apart from the front end edge 18*b* of the upward reflecting surface 18*a* to the rear side in the first horizontal plane 18*a*1, the following operation effects can be obtained.

The light shielded by the upright wall 30 is the light that forms a region in the vicinity below the opposite-lane cut-off line CL1 in the light distribution pattern PL for low beams. Thus, by preventing this light from being radiated forward, the region in the vicinity below the opposite-lane cut-off line CL1 can be prevented from becoming brighter than necessary. Accordingly, even if the light that forms the region A in the vicinity below the opposite-lane cut-off line CL1 enters driver's eyes on the opposite lane when the light is regularly reflected by a road surface that gets wet, for instance, during a rainy day or when a vehicle is pitched, large glare can be prevented from being given to a driver on the opposite lane.

As described above, according to one or more embodiments, when a projector-type lamp unit that uses a light-emitting element as a light source is adopted as the lamp unit 10 of a vehicle headlamp, large glare can be prevented from being given to a driver on the opposite lane while the light distribution pattern for low beams that has clear cut-off lines CL1, CL2, and CL3 at its upper end can be formed.

Moreover, in the present embodiment, the end of the upper end face 30*a* of the upright wall 30 opposite the optical axis Ax is constituted with the inclined surface 30*a*1 whose height becomes gradually small in a direction away from the optical axis Ax. Thus, the amount of the light shielded by the upright wall 30 can be gradually changed at the end of the upper end face of the upright wall opposite the optical axis. Accordingly, it is possible to effectively suppress that light distribution unevenness may be caused at a horizontal outside end (that is, right end) in the region A in the vicinity below the opposite-lane cut-off line CL1. Particularly, because the horizontal outside end in this region A is low in luminous intensity and is easily conspicuous in light distribution unevenness, as compared with a central portion of the light distribution pattern PL for low beams, it is especially effective to adopt such a configuration.

In addition, in one or more embodiments, the height of the upright wall 30 is set to 0.3 to 0.7 mm, and the position of the front end face of the upright wall 30 is set to the position of 1 to 4 mm from the rear focal point F of the projection lens 12. Thus, the portion adjacent to front end edge 18*b* in the upward reflecting surface 18*a* will ensure the function as the upward reflecting surface 18*a*. Accordingly, the glare to be given to a driver on the opposite lane can be reduced while the cut-off lines CL1, CL2, and CL3 formed by the front end edge 18*b* of the upward reflecting surface 18*a* can be formed clearly.

Furthermore, in one or more embodiments, the inclined surface 30*a*2 is formed at the end of the upper end face 30*a* of the upright wall 30 on the side of the optical axis Ax so as to extend to the position of the lower end edge of the middle slope 18*a*3 of the upward reflecting surface 18*a* at a slightly larger inclination angle than the downward inclination angle of the middle slope 18*a*3 of the upward reflecting surface 18*a*, and an upper end of the inclined surface 30*a*2 is constituted with a convex surface that protrudes upward so as to be adjacent to the left side of the optical axis Ax. Thus, the region A in the vicinity below the opposite-lane cut-off line CL1 can be formed so as to extend to near the line V-V without causing a hindrance to formation of the oblique cut-off line CL3. Accordingly, the glare to a driver on the opposite lane can be reduced effectively.

Although the description of the above embodiments has been made with respect to the case where the upright wall 30 extending the vehicle width direction is formed as a shielding projection that shields a portion of the reflected light from the reflector 16 reflected by the first horizontal plane 18*a*1, it is also possible to adopt a configuration where one or a plurality of boss-like projections are formed as the shielding projection.

Although the description of the above embodiments has been made with respect to the case where the light-emitting chip 14*a* of the light-emitting element 14 has a square light-emitting surface of 1 mm×1 mm, a configuration which the light-emitting chip has a light-emitting surface of other shapes or sizes than the above ones can also be adopted, and a plurality of the light-emitting chips 14*a* can also be arranged adjacent to one another.

Moreover, although the description of the above embodiments has been made about the case where the upward reflecting surface 18*a* is formed so as to rearward extend along the optical axes Ax from the position of the rear focal point F, it is also possible to adopt a configuration in which the upward reflecting surface 18*a* is formed in a slightly (for example, about 1.5°) front lower direction with respect to the longitudinal direction of a vehicle. By adopting such a configuration, a mold can be easily extracted when the mirror member 18 is molded, and more of the reflected light from the reflector 16 reflected by the upward reflecting surface 18*a* can be made to enter the projection lens 12.

In addition, the numeric values shown as dimensional data in the above embodiments are just illustrative, and it is natural that the values may be set to suitably different values.

While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

REFERENCE NUMERALS

10: LAMP UNIT
12: PROJECTION LENS
14: LIGHT-EMITTING ELEMENT
14*a:* LIGHT-EMITTING CHIP
14*b:* SUBSTRATE
16: REFLECTOR
16*a:* REFLECTING SURFACE
18: MIRROR MEMBER
18B: REAR EXTENSION PORTION
18C: RECESSED BENT PORTION
18*a:* UPWARD REFLECTING SURFACE
18*a*1: FIRST HORIZONTAL PLANE
18*a*2: SECOND HORIZONTAL PLANE
18*a*3: MIDDLE SLOPE
18*b:* FRONT END EDGE
18*c:* ROUGHENED PORTION
18*d:* DIFFUSING AND REFLECTING ELEMENT
30: UPRIGHT WALL AS SHIELDING PROJECTION
30*a:* UPPER END FACE
30*a*1, 3O*a*2: INCLINED-SURFACE
A: REGION
Ax: OPTICAL AXIS
CL1: OPPOSITE-LANE CUT-OFF LINE
CL2: SELF-LANE CUT-OFF LINE
CL2: OBLIQUE CUT-OFF LINE
E: ELBOW POINT
F: REAR FOCAL POINT
HZ: HOT ZONE
PL: LIGHT DISTRIBUTION PATTERN FOR LOW BEAMS

What is claimed is:

1. A lamp unit of a vehicle lamp comprising:
a projection lens disposed on an optical axis extending in a longitudinal direction of a vehicle;
a light-emitting element disposed near the optical axis and facing upward behind a rear focal point of the projection lens;
a reflector covering the light-emitting element from above that reflects light from the light-emitting element forward toward the optical axis;
a mirror member disposed between the reflector and the projection lens, the mirror member comprising:
an upward reflecting surface that upward reflects a portion of the reflected light from the reflector, wherein a region of the upward reflecting surface located nearer a self-lane side than the optical axis comprises a horizontal plane including the optical axis, and
a front end edge formed so as to pass through a portion in the vicinity of the rear focal point of the projection lens; and
a shielding projection that shields the reflected light from the reflector deflected by the horizontal plane and is disposed in a position of the horizontal plane that is apart from a front end edge of the upward reflecting surface to a rear side.

2. The vehicle headlamp according to claim 1,
wherein the shielding projection comprises an upright wall extending in a vehicle width direction.

3. The lamp unit of a vehicle headlamp according to claim 2, wherein an end of an upper end face of the upright wall opposite the optical axis comprises an inclined surface whose height becomes gradually small in a direction away from the optical axis.

4. The lamp unit of a vehicle headlamp according to claim 1, wherein a position of a front end edge of the shielding projection is set to a position of 1 to 4 mm from the rear focal point of the projection lens.

5. The lamp unit of a vehicle headlamp according to claim 2, wherein a position of a front end edge of the shielding projection is set to a position of 1 to 4 mm from the rear focal point of the projection lens.

6. The lamp unit of a vehicle headlamp according to claim 3, wherein a position of a front end edge of the shielding projection is set to a position of 1 to 4 mm from the rear focal point of the projection lens.

7. A method of manufacturing a lamp unit of a vehicle lamp comprising:

disposing a projection lens on an optical axis extending in the longitudinal direction of a vehicle, disposing a light-emitting element near the optical axis facing upward behind a rear focal point of the projection lens, and covering the light-emitting element from above with a reflector that reflects light from the light-emitting element forward toward the optical axis, disposing a mirror member between the reflector and the projection lens, the mirror member comprising:

an upward reflecting surface that upward reflects a portion of the reflected light from the reflector, wherein a region of the upward reflecting surface located nearer a self-lane side than the optical axis comprises a horizontal plane including the optical axis, and a front end edge formed so as to pass through the rear focal point of the projection lens, and disposing a shielding projection that shields the reflected light from the reflector deflected by the horizontal plane in a position of the horizontal plane that is apart from a front end edge of the upward reflecting surface to a rear side.

8. The method according to claim 7, further comprising forming the shielding projection as an upright wall extending in a vehicle width direction.

9. The method according to claim 8, further comprising:

forming an end of an upper end face of the upright wall opposite the optical axis as an inclined surface whose height becomes gradually small in a direction away from the optical axis.

10. The method according to claim 7, further comprising setting a position of the front end edge of the shielding projection to a position of 1 to 4 mm from the rear focal point of the projection lens.

* * * * *